Figure 1:
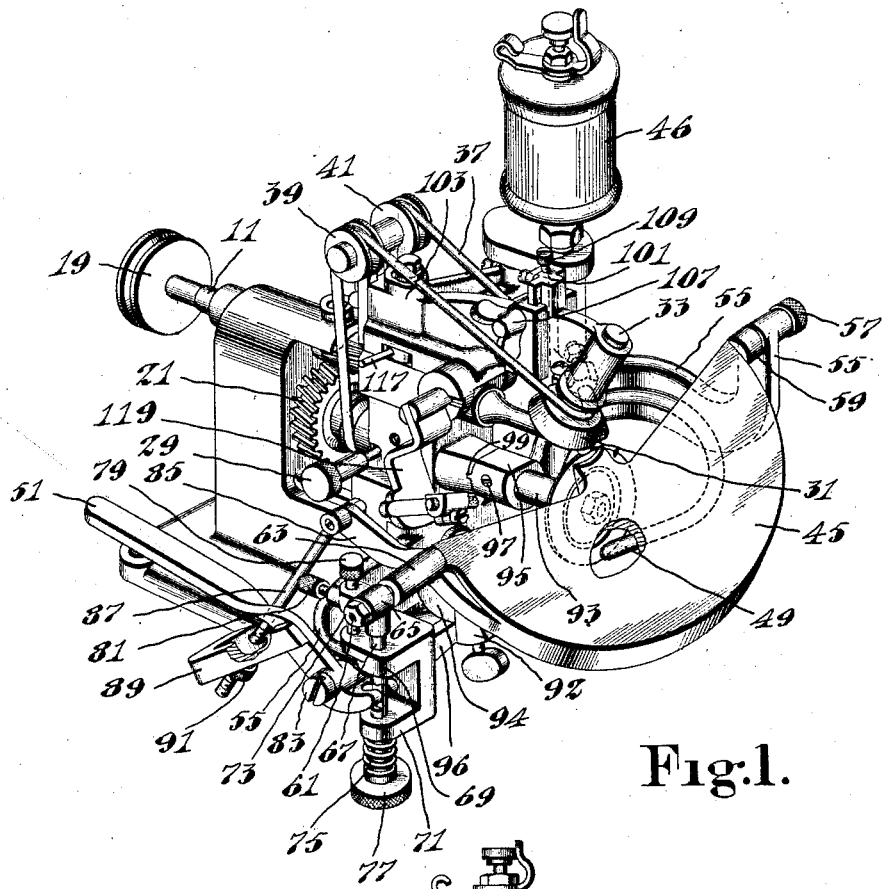

Sept. 4, 1928.

S. J. FINN 1,682,780

TRIMMING MACHINE

Original Filed Feb. 27, 1925 2 Sheets-Sheet 1

INVENTOR.
Sidney J. Finn
By his Attorney,
Nelson W. Howard

Sept. 4, 1928.       1,682,780
S. J. FINN
TRIMMING MACHINE
Original Filed Feb. 27, 1925    2 Sheets-Sheet 2

INVENTOR
Sidney J. Finn
By his Attorney,
Nelson M. Howard

Patented Sept. 4, 1928.

1,682,780

UNITED STATES PATENT OFFICE.

SIDNEY J. FINN, OF BEVERLY, MASSACHUSETTS, ASSIGNOR TO UNITED SHOE MACHINERY CORPORATION, OF PATERSON, NEW JERSEY, A CORPORATION OF NEW JERSEY.

TRIMMING MACHINE.

Application filed February 27, 1925, Serial No. 12,052. Renewed February 2, 1928.

This invention relates to trimming machines and is herein illustrated as embodied in a machine for trimming the overflow from molded and vulcanized rubber heels.

Such heels are made by placing blanks of unvulcanized rubber or rubber compound in molds and subjecting them to heat and pressure. In order to insure that the molds shall be completely filled, the blanks are made a little oversize. Consequently, during the heating and pressing operation, more or less rubber overflows into the spaces between the parts of the mold, and at the end of the operation, this overflow forms lips or fins of vulcanized rubber which project from the top and bottom edges of the heel. In order to complete the heels, this overflow is commonly removed by means of a trimming machine.

A machine which is commonly used comprises trimming mechanism in the form of a pair of cooperating rotary cutters and a work table which may be adjusted angularly to vary the inclination of the cut and bodily to vary the level at which the work is presented to the cutters, a machine of this general organization being disclosed in application Serial No. 569,800, filed June 21, 1922, in the name of Brogan, now Patent No. 1,534,257. The angular adjustment is desirable in order that a clean cut may be made and for certain other reasons which will be explained more in detail in the specification. The bodily adjustment is desirable because in some cases certain localities on the faces of heels are at different levels from that of the edges of said faces; and the table is raised or lowered as may be required to bring the overflow into proper position to be severed by the cutters.

According to one feature of the present invention, a machine having trimming mechanism and an angularly and bodily adjustable table is provided with a single member manipulation of which can be caused to effect both adjustments. In the illustrative machine this member takes the form of a manually operable lever conveniently located so that, while with one hand the operator is guiding the work over the table, with the other hand he may at the proper times change both adjustments of the table.

In machines of this kind in which a rotary cutter is employed it is necessary that the cutter be maintained exceedingly sharp; and to this end, another feature of the invention relates to a sharpening mechanism which may be rendered operative at will and is so constructed and arranged that the sharpening stone may be moved across the beveled edge of the cutter in a path beginning at the base of the bevel and extending to the edge thereof. By causing the beveled edge to be stroked in this manner, an extremely sharp edge may be maintained.

These and other features of the invention including certain details of construction and combinations of parts will be described as embodied in an illustrative machine and pointed out in the appended claims.

Referring now to the accompanying drawings

Figure 2:
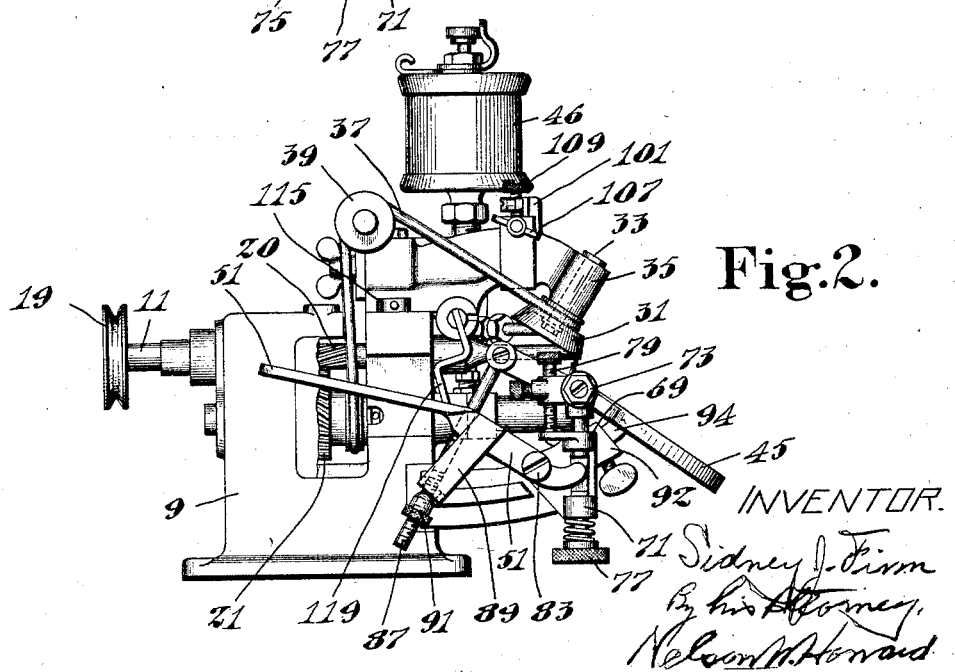
Figure 3:
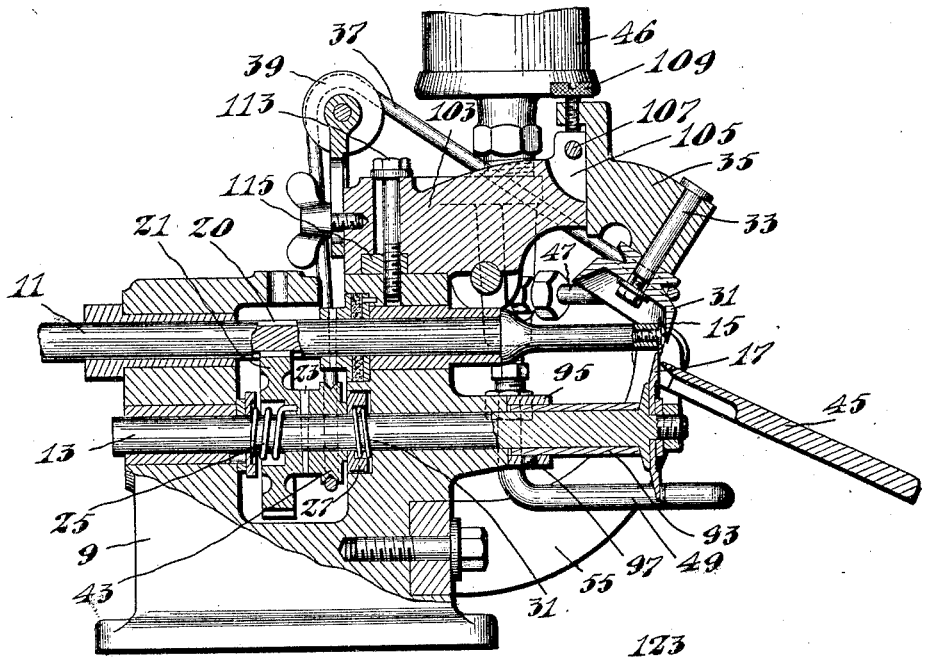
Figure 4:
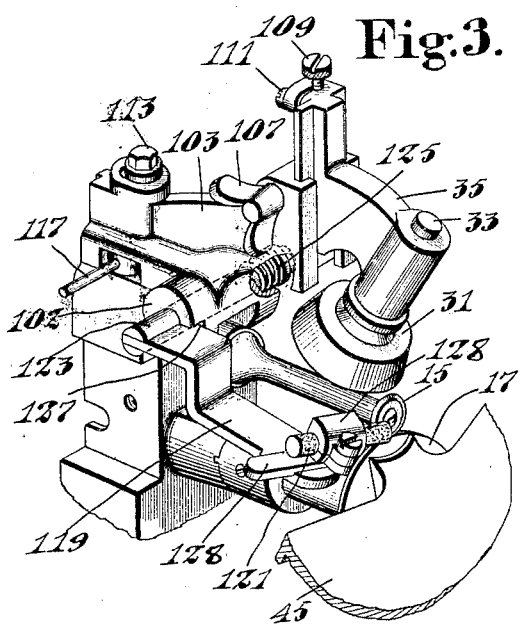
Figures 5, 6, 7:
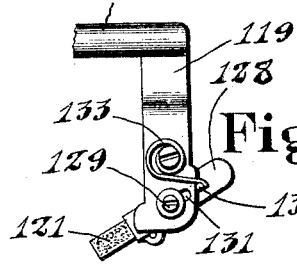

Fig. 1 is a perspective of a machine in which the present invention is embodied, Fig. 2 is an elevation of the machine, Fig. 3 is a vertical longitudinal section of the machine, Fig. 4 is a perspective showing more particularly the cutter-sharpening device in operative position, the hollow guard for the upper cutter having been moved into raised position to expose the upper cutter, Fig. 5 is a plan of certain parts shown in Fig. 4, and Figs. 6 and 7 are two views principally in section showing a rubber heel in process of being operated upon; and the two positions to which the operator moves the table.

Before proceeding to describe in detail the features which are new, a general description of the machine and its mode of operation will be given.

The machine comprises a frame 9 in suitable horizontal bearings of which are rotatable two shafts 11, 13 having fast respectively at their outer ends a disk cutter 15 of small diameter and a cooperating disk cutter 17 of larger diameter. The upper shaft 11 carries at the end remote from the small cutter 15 a pulley 19 to receive a driving belt. The shaft 11 has cut upon it an elongated gear 20 with which meshes a gear 21 fastened by a pin 23 to the shaft 13. A comparatively heavy coiled spring 25 urges the gear 21 and shaft 13 to the right so as to push the upper portion of the lower cutter 17 against the lower portion of the upper cutter 15 in the localities in which the cutters overlap. The upper cutter is a thin flexible one; and the strength of the spring 25 is so chosen as to cause the upper cutter to be bent slightly so that it is progressively flexed as the cutters are rotated. The distance to which the shaft 13 is moved to the right by the spring 25 is thus determined by the overlapping engagement of the cutters. It is not desirable, however, that the spring 25 should be continually pressing the lower cutter against the upper one without limit during the operation of the machine; and to prevent this from taking place, there is provided on the shaft 11 a collar 27 into which is threaded the stem of a clamping screw 29 (see Fig. 1), said stem extending through an elongated slot in the frame of the machine and having a shoulder such that, when the clamping screw is tightened, the shoulder engages the frame and holds the collar 27 from movement. A light spring 31 urges the collar 27 to the left and maintains said collar in contact with the hub of the gear 21 at such times as the shaft 13 may be moved manually to the left with the clamp screw 29 loosened. In adjusting the lower cutter 17 to the right, the clamp screw 29 is loosened to permit the spring 25 to push the lower shaft 13 to the right sufficiently to flex the upper cutter 15, the strength of this spring being just sufficient to produce the proper flexure. The screw 29 is then tightened. If presently, because of wear, or for any other reason, the cutters are not pressed together with the desired force, the operator merely loosens the screw 29 and tightens it again.

Extending over the upper cutter 15 is a guard 31 fast to the lower end of an inclined spindle 33 carried by a bracket 35, a round belt 37 passing around the guard, over idle pulleys 39, 41, and around a pulley 43, which is integral with the hub of the gear 21. Mounted at the right of the cutters is a table or work support 45 which is angularly adjustable about a substantially horizontal axis located close to the bite of the cutters and is also adjustable up and down bodily to vary the position of the table vertically. A reservoir 46 supplies lubricant through pipes 47, 49 to the guard 31 and to the lower cutter 17 respectively, there being in the delivery ends of these pipes pieces of felt or similar material which contact with the guard and with the cutter. In the operation of the machine, a molded rubber heel is placed upon the table 45 with its overflow or fin projecting beneath the thin-edged guard 31 into the bite of the cutters and fed in such manner as to cause the fin to be severed, the angular position of the table as well as its height being varied as may be desired as different portions of the fin are trimmed off.

The general organization of the machine, as thus far described, may be substantially the same as is disclosed in the patent to Brogan referred to above, the particular features being claimed respectively in that patent and in application Serial No. 524,293, filed Jan. 23, 1919, in the names of Putt & Stevens, now Patent No. 1,533,139, application Serial No. 507,195, filed Oct. 12, 1921, in the name of Brogan, now Patent No. 1,534,053, and application Serial No. 732,992, filed August 19, 1924, in my name, all of said patents and said application being owned by the same assignee as is the present application.

Referring now more particularly to Figs. 6 and 7, the table is shown in two successive positions which it commonly occupies when a heel is being trimmed. Rubber heels very commonly have projections on their tread faces such for example as the rings which encircle the nail holes. In Figs. 6 and 7, a heel of this kind is shown at 100 and the projections at 200. Assuming now that the table 45 is at the proper height as in Fig. 6 to bring the overflow on the tread face of the heel into the bite of the cutters, then if the heel is turned over and placed with its heel-seat face upon the table, it will be evident that the table must be raised to bring the overflow from the heel-seat face into the bite of the cutters. Fig. 7 shows the heel so placed and the table raised. The illustrative heel is a flat one with projections on the tread face thereof, but the same necessity for changing the height of the table arises in the case of heels which are concavo-convex, whether or not such heels have projections on their tread faces, the table being lowered as in Fig. 6 when the convex face rests upon it and being raised as in Fig. 7 when the concave face rests upon it.

Besides raising and lowering the table, it is also desirable at the same time to change its inclination. One or more of the edge faces of rubber heels are commonly beveled, the bevel extending upwardly and outwardly with respect to the heel from the tread face to the heel-seat face, as shown in Figs. 6 and 7. Moreover, the fin or overflow at the edge of the tread face does not always extend parallel to said face, but sometimes extends at right anlges thereto. For these reasons the heel should be supported at a considerable angle of inclination when its tread face is resting upon the table. When, however, the overflow at the heel-seat face comes to be trimmed, a different condition is encountered. The bevel of the edge face does not in this case require that the table should be at so great an angle and, moreover, there is in most cases good reason why the angular inclination should be less. The molds in which rubber heels are made are usually so constructed that most of the overflow of the rubber occurs at the heel-seat face with the result that the overflow at this face has considerable thickness and should therefore be severed by a cut which is more nearly parallel to the edge face of the heel.

In the illustrative machine a pivoted manually operable lever 51 conveniently accessible to the operator is so connected with the table that depressing the lever changes the position of the table from that shown in Fig. 6 to that shown in Fig. 7, and releasing the lever permits the table to return to the position shown in Fig. 6. To this end the far end of the table, as viewed in Fig. 1, is supported by an upturned portion of a stationary curved bar 55 which is fast to the frame of the machine. Through the end of the upturned portion of the bar 55 is threaded a pivot screw 57, the enlarged rounded head on the inner end of which is received in a suitable socket formed in a boss 59 on the table. The near end of the table (Fig. 1) is also supported by the bar 55 but in such manner that this end of the table may be raised and lowered with respect to the bar. A screw 61, similar to the screw 57, has a rounded head which is received, like the rounded head of the screw 57, in a suitable socket in a boss 63 formed on the table. The screw 61, however, is not mounted directly in the bar 55 but is threaded through a boss 65 formed at the upper end of a rod 67 which is vertically slidable in alined bores formed in lugs 69, 71 which are integral with the bar 55, the screw 61 being locked in position by a nut 73. A spring 75 bearing at its upper end against the lug 71 and at its lower end against a thumb-nut 77, threaded on the rod 67, tends at all times to pull the rod, and with it the end of the table downwardly. In order to limit adjustably this downward movement, a set screw 79, threaded through an extension on the boss 65, contacts with the upper surface of the lug 69 and is held in adjusted position by a second set-screw 81. The hand lever 51 is pivoted to the bar 55 at 83 and has at its right-hand end a yoke which straddles a flattened locality of the vertical rod 67 so that when the hand lever is depressed the table will be raised.

Extending to the left from the near end of the table, as viewed in Fig. 1, is an arm 85 pivoted at its left-hand end to the upper end of a rod 87, the lower end of the rod passing through a yoke formed at one end of a right-angled bracket 89 which is rigid with the lever 51, there being threaded upon the lower end of the rod a nut 91 having a rounded upper end as shown in Fig. 2. The position of this nut determines the extent to which the table will be swung upwardly about its axis when the lever 51 is depressed. Screwing the nut farther upon the rod will cause the table to be swung farther upward. The initial angular position of the table—that is its lower position as shown in Fig. 6—is determined by the position of a stop 92 which is adjustable on a curved bar 94 carried by the table, said stop being held in adjusted position on the bar 94 by a set screw and being adapted to contact with a stop in the form of a lug 96 (Fig. 1) carried by the bar 55. When a given lot of heels is to be trimmed, the screw 79, which regulates the normal height of the table, and the stop 92, which regulates the normal inclination of the table, are adjusted until the height and inclination of the table are right for the particular lot of heels, for example until the table occupies the position shown in Fig. 6. The heels are then trimmed one by one. When the overflow at the tread face has been trimmed, with the table in the position shown in Fig. 6, the hand lever 51 is depressed to move the table into the position shown in Fig. 7 and is held depressed until the overflow at the heel-seat face is trimmed. And if at any time during the trimming operation it is desirable to cause the table to occupy an intermediate position, as may occur when the overflow along one of the breast edges is being trimmed, such intermediate position can readily be obtained. In this connection it should be noted that the edge of the table next to the cutters is cut away (Fig. 1) on both sides of its middle portion so as to leave a projection adjacent the cutters upon which the breast edge face of a heel may be placed and upon which the heel may be caused to move in a curved path, this particular manipulation being employed at times particularly in the case of heels which are concavo-convex and have a peculiarly shaped overflow along the breast edge.

In order to prevent the strip of overflow which is cut off from being wound about the shaft of the lower cutter, the forward portion of the shaft (see Fig. 3) is enclosed in a stationary sleeve 93, the left-hand end of the sleeve extending into a wide collar 95 which is fastened to the sleeve by a screw 97 and is held from turning by a key 99 as shown in Fig. 1.

It is desirable that the hollow guard and feed member 31 should be capable of adjustment vertically and horizontally in order to permit it readily to be located properly with respect to the upper cutter as well as to permit the sharpening stone to be used. To this end the bracket 35 (Figs. 1, 3 and 4) has formed upon it a T-shaped slide 101 which is received in a suitably shaped vertical guideway formed at the right-hand end of a carrier block 103, the right-hand end of said block being to an extent cut away as indicated at 105 in Fig. 3 so that a pinch-screw 107 may be employed to aid in holding the slide 101, and with it the guard 31, in adjusted vertical position. In order to facilitate vertical adjustment of the bracket 35, the slide 101 has a rearward projection through which is threaded a screw 109 which is held in adjusted position by a pinch-screw 111. The carrier block 103 is slidable in suitable ways in a path substantially parallel to the axis of the shaft 11, being held in adjusted position by a cap screw 113 which passes through a slot in the block and is threaded into the frame of the machine. At the lower end of the slot is a socket in which is received a disk 115 eccentrically mounted on the stem of the cap screw. A pin 117 (Fig. 4), driven into this disk, furnishes means for turning the disk to adjust the block 103 and with it the hollow guard 31.

In order that the machine may operate satisfactorily it is essential that the upper cutter be kept sharp; and to this end there is provided a sharpening stone holder or bracket which may readily be moved into or out of operative position. Referring first to Fig. 4, wherein the bracket 119 which carries the sharpenig stone 121 is shown in its operative position, this bracket is fast to one end of a rod 123 which is slidable and rotatable in a suitable bearing formed in a boss 102 on the block 103, a coiled spring 125 acting at all times to pull the rod into its socket; and when the bracket 119 is in the position shown in Fig. 4, the inner edge of the bracket adjacent to the rod is drawn into a slot 127 formed in the boss 102 and is thus held securely while the operator manipulates the sharpening stone 121 in a manner presently to be described. Slidably mounted in a guideway at the outer end of the bracket 119 is a holder 128 for the sharpening stone 121, said holder being held in said guideway by a screw 129 which passes through a slot in the bracket and is threaded into the holder. A coiled spring 133, fastened at one end to the bracket 119 and engaging with its free end a pin 135 driven into the holder 128, tends at all times to move the sharpening stone into and to hold it in the position shown.

Normally, the bracket 119 occupies its inoperative position as shown in Figs. 1 and 2. When it is desired to sharpen the upper cutter 15 the guard 31 is raised and the bracket swung up into the position shown in Fig. 4 and released, whereupon the spring 125 pulls the edge of the bracket into the slot 127 and brings the stone 121 into contact with the cutter 15. The manipulation of the grinding device thereafter is as follows:—The holder 128 is pulled back against the force of the spring 133 so as to draw the stone across the beveled edge of the cutter 15. The holder is then released but does not automatically move back to the position shown in Figs. 4 and 5, because the spring 133 is purposely made so weak that it will not move the holder 128 under these conditions. The bracket 119 is next pulled out slightly to separate the stone from the cutter, whereupon the spring 133 becomes effective to project the holder 128 and with it the stone once more into the position shown in Figs. 4 and 5. The bracket 119 is then released and the procedure, which has been described above, is repeated if necessary. With this construction it will be noted that a considerable extent of the surface of the stone 121 is employed and that the cutter is, so to speak, stroked always from a locality inside the extreme edge toward said edge and not in the opposite direction.

Although the invention has been described as embodied in a particular machine it should be understood that the invention is not limited in the scope of its application to the particular machine which has been shown and described.

Having thus described my invention, what I claim as new and desire to secure by Letters Patent of the United States is:

1. A machine of the class described having in combination, trimming mechanism, a work table mounted for angular adjustment to vary the angle of the trimming cut and for bodily adjustment to vary the level at which the work is presented to the trimming mechanism, and a single operator-controlled member manipulation of which may be caused to effect both adjustments.

2. A machine of the class described having, in combination, trimming mechanism, a work table mounted for angular adjustment to vary the angle of the trimming cut and for bodily adjustment to vary the level at which the work is presented to the trimming mechanism, and a single operator-controlled member movement of which in one direction causes both adjustments to be effected.

3. A machine of the class described having, in combination, trimming mechanism, a work table angularly adjustable to vary the angle of the trimming cut and bodily adjustable to vary the level at which the work is presented to the trimming mechanism, a single operator-controlled member, and connections between different portions of the member and the table such that manipulation of the member may be caused to effect both adjustments.

4. A machine of the class described having, in combination, a rotary cutter, a cooperating shear member, a work table angularly adjustable to vary the angle of the cut and bodily adjustable to vary the level at which the work is presented to the cutter, and a single manually-controlled member manipulation of which may be caused to effect both adjustments.

5. A machine of the class described having, in combination, a rotary cutter, a cooperating shear member, a work table angularly adjustable to vary the angle of the cut and bodily adjustable to vary the level at which the work is presented to the cutter, and a single manually-controlled member manipulation of which in one direction causes both adjustments to be effected.

6. A machine of the class described having, in combination, a pair of cooperating rotary cutters, a work table angularly adjustable about an axis located adjacent to the bite of the cutters and bodily adjustable up and down, and a single operator-controlled member manipulation of which may be caused both to adjust the table angularly and to change its level.

7. A machine of the class described having, in combination, trimming mechanism, a work table angularly adjustable to vary the angle of the trimming cut and bodily adjustable to vary the level at which the work is presented to the trimming mechanism, the table being normally considerably inclined and in its lower position, and a single operator-controlled member manipulation of which raises the table and decreases its angular inclination.

8. A machine of the class described having, in combination, a rotary cutter, a thin-edged guard extending in front of the cutter, a work table located in front of the cutter and having its supporting face spaced below the edge of the cutter, and means whereby the guard may be adjusted toward and from the table and in a direction substantially parallel to the axis of rotation of the cutter.

9. A machine of the class described having, in combination, a rotary cutter, a thin-edged rotatable hollow guard extending over said cutter, a work table arranged to support the work with the overflow therefrom extending beneath the guard into the path of the cutter, and means whereby said guard may be adjusted toward and from the cutter in two directions.

10. A machine of the class described having, in combination, a rotary cutter, a thin-edged rotatable hollow guard extending over said cutter, a work table arranged to support the work with the overflow therefrom extending beneath the guard into the path of the cutter, and means whereby said guard may be adjusted vertically and in a direction substantially parallel to the axis of rotation of the cutter.

11. A machine of the class described having, in combination, a rotary cutter, a thin-edged rotatable hollow guard extending over said cutter, a work table arranged to support the work with the overflow therefrom extending beneath the edge of the guard into the path of the cutter, a slide by which the guard is carried, and a bracket in which the slide is held, means for adjustably holding the bracket on the frame of the machine, and means for adjustably holding the slide in the bracket.

12. A machine of the class described having, in combination, a rotary disk cutter, a sharpening stone, a bracket in which the stone is slidably mounted, said bracket being normally in inoperative position but capable of being moved into operative position, a spring acting upon the bracket when the bracket is in the last named position to hold the stone against the beveled edge of the cutter, and a weak spring tending to move the sharpening stone with respect to the bracket.

13. A machine of the class described having, in combination, a rotary disk cutter having a beveled edge, a sharpening stone, a bracket movable to bring the stone into cooperative relation to the beveled edge of the cutter, a comparatively strong spring acting through the bracket to hold the stone against the cutter, said stone being slidable with respect to the bracket in a direction substantially parallel to the beveled edge of the cutter, and a weak spring tending to move the stone with respect to the bracket.

14. A machine of the class described having, in combination, a rotary disk cutter having a beveled edge, a hollow guard extending over the cutter, said guard being capable of being raised to permit free access to the cutter, a bracket for a sharpening stone, said bracket being movable from inoperative to operative position when the guard is in raised position, a sharpening stone slidably mounted in the bracket, a comparatively heavy spring acting upon the bracket to hold the stone against the cutter, and a second weaker spring tending to move the stone in a direction parallel to the beveled edge of the cutter, said last named spring being so weak that it will not move the stone until the stone has been disengaged from the cutter.

15. A trimming machine comprising trimming means, a table arranged to support the work in position to be trimmed, said table being capable of a plurality of different kinds of adjustment, a manually operable adjusting member, and connections from said member to said table through which adjusting motion of said member is transmitted to effect said different kinds of adjustment of the table.

In testimony whereof I haved signed my name to this specification.

SIDNEY J. FINN.